(12) United States Patent
Ancuta et al.

(10) Patent No.: US 9,784,135 B2
(45) Date of Patent: Oct. 10, 2017

(54) TURBINE ENGINE COMPRISING MEANS FOR SUPPORTING AT LEAST ONE ITEM OF EQUIPMENT

(71) Applicant: SNECMA, Paris (FR)

(72) Inventors: Carmen Gina Ancuta, Paris (FR); Jeremy Edmond Fert, Paris (FR)

(73) Assignee: SNECMA, Paris (FR)

( * ) Notice: Subject to any disclaimer, the term of this patent is extended or adjusted under 35 U.S.C. 154(b) by 103 days.

(21) Appl. No.: 14/533,533

(22) Filed: Nov. 5, 2014

(65) Prior Publication Data

US 2016/0215654 A1 Jul. 28, 2016

(30) Foreign Application Priority Data

Nov. 8, 2013 (FR) ...................... 13 60932

(51) Int. Cl.

| | |
|---|---|
| *F16M 1/00* | (2006.01) |
| *F01D 25/28* | (2006.01) |
| *F02C 7/20* | (2006.01) |
| *F02C 7/32* | (2006.01) |
| *F01D 25/04* | (2006.01) |
| *B64D 27/26* | (2006.01) |

(52) U.S. Cl.
CPC ............ *F01D 25/28* (2013.01); *F01D 25/04* (2013.01); *F02C 7/20* (2013.01); *F02C 7/32* (2013.01); *B64D 2027/266* (2013.01); *B64D 2027/268* (2013.01); *F05D 2220/323* (2013.01); *F05D 2240/90* (2013.01)

(58) Field of Classification Search
CPC .. F01D 25/28; F01D 25/04; F02C 7/32; F02C 7/20; B64D 27/26; B64D 2027/262; B64D 2027/268; B64D 2041/002; B64D 2027/266; F05D 2220/323; F05D 2240/90
See application file for complete search history.

(56) References Cited

U.S. PATENT DOCUMENTS

| | | | | |
|---|---|---|---|---|
| 4,044,973 A | * | 8/1977 | Moorehead ............ | B64D 27/20 244/54 |
| 5,452,575 A | * | 9/1995 | Freid ...................... | B64D 27/18 244/54 |

(Continued)

FOREIGN PATENT DOCUMENTS

| | | |
|---|---|---|
| EP | 2 607 658 A2 | 6/2013 |
| FR | 2 925 016 A1 | 6/2009 |

(Continued)

OTHER PUBLICATIONS

French Preliminary Search Report issued Aug. 1, 2014, in French Application No. 13 60932 filed Nov. 8, 2013 (with Written Opinion and English Translation of Categories of Cited Documents).

*Primary Examiner* — Christopher E Garft
(74) *Attorney, Agent, or Firm* — Oblon, McClelland, Maier & Neustadt, L.L.P.

(57) ABSTRACT

Turbine engine, comprising means for absorbing the thrust forces from its engine, which comprise longitudinal connecting rods, the ends of which are connected to structural annular casings of the turbine engine, characterized in that it comprises means for supporting at least one item of equipment on said thrust-absorbing connecting rods and/or for suspending at least one item of equipment from said thrust-absorbing connecting rods.

11 Claims, 1 Drawing Sheet

(56) References Cited

U.S. PATENT DOCUMENTS

| | | | | |
|---|---|---|---|---|
| 6,474,597 B1* | 11/2002 | Cazenave | ............... | B64D 27/18 244/54 |
| 7,108,224 B2* | 9/2006 | Pasquer | ................. | B64D 27/26 244/54 |
| 2008/0245926 A1* | 10/2008 | Journade | ................ | B64D 27/26 244/54 |
| 2013/0160459 A1* | 6/2013 | Thies | ......................... | F02C 7/32 60/796 |
| 2014/0373555 A1* | 12/2014 | Beier | ....................... | F02C 7/20 60/796 |
| 2015/0047370 A1* | 2/2015 | Beaujard | ................. | F01D 25/28 60/797 |

FOREIGN PATENT DOCUMENTS

| | | | |
|---|---|---|---|
| FR | 2 963 320 A1 | 2/2012 | |
| FR | 2 987 347 A1 | 8/2013 | |

* cited by examiner

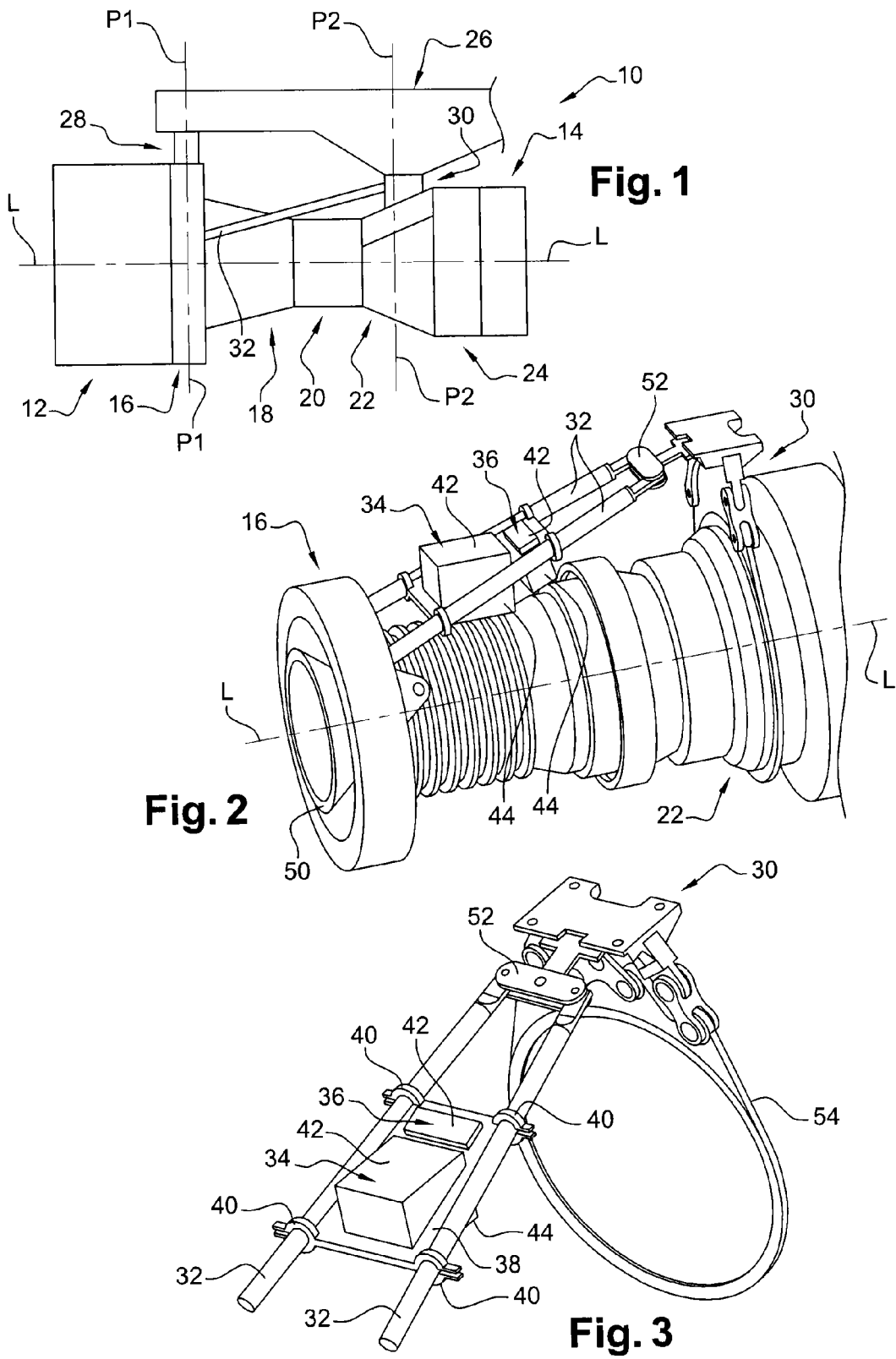

TURBINE ENGINE COMPRISING MEANS FOR SUPPORTING AT LEAST ONE ITEM OF EQUIPMENT

TECHNICAL FIELD

The present invention relates to a turbine engine comprising means for supporting at least one item of equipment.

PRIOR ART

An aircraft turbine engine comprises, from upstream to downstream, in the direction of flow of the gases in the engine, an air inlet, at least one compressor, a combustion chamber, at least one turbine, and an exhaust nozzle for ejecting the combustion gases.

A bypass turbojet engine comprises in particular a low-pressure body comprising a first shaft connecting a low-pressure compressor to a low-pressure turbine, and a high-pressure body comprising a second shaft connecting a high-pressure compressor to a high-pressure turbine. The air entering the engine is compressed successively in the low-pressure compressor and the high-pressure compressor before being mixed with fuel that is burnt in the combustion chamber. The combustion gases next expand in the high-pressure turbine and then the low-pressure turbine in order to rotate the low-pressure shaft, which in turn drives a fan shaft, the fan being mounted upstream of the compressors and generating the major part of the thrust of the turbojet engine.

The various modules of the turbine engine are surrounded by structural annular casings, that is to say casings that are sufficiently rigid to transmit forces. Thus a turbine engine may comprise, from upstream to downstream, a fan casing, a low-pressure compressor casing, an intermediate casing that extends between the low-pressure and high-pressure compressors, high-pressure compressors, combustion chamber and high-pressure turbine casings, an inter-turbine casing that extends between the high-pressure and the low-pressure turbines, a low-pressure turbine casing and an exhaust casing in the region of the nozzle of the turbine engine.

In the prior art, increasing the bypass ratio of a bypass turbojet engine is known, that is to say the ratio of the secondary flow rate generated by the fan to the primary flow rate supplying the engine. This increases the "wasp waist" effect of the turbine engine, the engine of which has a body (in particular in the region of the high-pressure compressor) that has a relatively small diameter compared with the fan casing.

The more marked the wasp waist of a turbine engine, the more its body risks flexing in operation. To remedy this problem, equipping a turbine engine with means for absorbing the thrust forces of the engine are known, which in general comprise longitudinal connecting rods, one end of which is articulated on the intermediate casing and the opposite end of which is articulated on means for suspending the turbine engine on an aircraft strut.

The role of the thrust-absorbing connecting rods is to limit the thrust loads passing through the engine casings, which prevents the flexing under load of the sensitive casings, such as those of the compressors and turbines, where good concentricity is essential in particular for minimising the clearances at the apex of the rotor blades and ensuring satisfactory performances.

Moreover, a turbine engine comprises numerous items of equipment. It has already been proposed to mount equipment in the vicinity of the engine body. However, this equipment is in general relatively bulky and integration thereof is relatively complex around the engine casings, in particular since there are already numerous accessories already installed in this region. The aforementioned thrust-absorbing connecting rods pass through this region and make such integration difficult since the equipment must be separated from the connecting rods by sufficient clearances to prevent any contact between them.

In addition to the problem of relative positioning of the equipment in a small space, the problem of the support thereof is posed. This is because the high-pressure compressor around which the majority of the equipment is installed (this is the least hot region of the engine body) comprises several variable-fixing stages controlled by a VSV (variable stator vane) system, the space requirement of which does not make it possible to produce accessible bosses for supporting the equipment. The regions that make it possible to produce these fixing points are thus situated upstream and downstream of these stages, which may be greater or lesser in number according to the architecture concerned. It is therefore possible to decide on the intermediate casing on the one hand or on the downstream part of the casing of the high-pressure compressor. However, it becomes difficult to find available attachment points since there are also many bosses for air offtakes (the VBV (variable bleed valve) outlets) on the intermediate casing and the numerous offtakes on the high-pressure compressor for controlling the turbine clearances, the cooling of the high and low-pressure turbine casings, the cabin air conditioning, etc.).

There therefore exists a real need for equipment support means in this region of the engine body.

The present invention affords in particular a simple, effective and economical solution to this requirement.

SUMMARY OF THE INVENTION

To this end the invention proposes a turbine engine comprising means for absorbing the thrust forces which comprise longitudinal connecting rods, the ends of which are connected to structural annular casings of the turbine engine, characterised in that it comprises means for supporting at least one item of equipment on said thrust-absorbing connecting rods and/or for suspending at least one item of equipment on said thrust-absorbing connecting rods.

The invention thus makes it possible to use thrust-absorbing connecting rods of a turbine engine for supporting or suspending at least one item of equipment and to integrate it in the engine compartment. Furthermore, mounting an item of equipment on the connecting rods makes it possible to distance it from the compressor and consequently to protect it more effectively from the thermal radiation thereof (because of the presence of a greater volume of air between the casing and the equipment). The connecting rods thus have a dual function of absorbing thrust and supporting equipment. Increasing the diameter of the connecting rods with respect to those of the prior art can be envisaged so that they can fulfil the additional support function, for example by increasing their quadratic moment.

The support and/or suspension means may comprise means for fixing to the connecting rods, at a distance from their ends. These fixing means may comprise clamping collars or bolted connections. This choice may depend on the cross-sectional shape of the connecting rods. The connecting rods may have a circular, square or rectangular cross section. Securing by means of fixing collars will be more suitable on connecting rods having a circular cross section, and on those having a non-circular cross section a bolted connection could be envisaged.

The support and/or suspension means may comprise a flat support such as a plate, extending substantially between the connecting rods and fixed thereto. Advantageously, the flat support and the connecting rods are substantially coplanar. The flat support may carry at least two items of equipment.

The thrust-absorbing connecting rods may form an angle between them.

The means for supporting and/or suspending the equipment may comprise vibration-damping means.

DESCRIPTION OF THE FIGURES

The invention will be better understood and other details, features and advantages of the invention will emerge from reading the following description, given by way of non-limiting example and with reference to the accompanying drawings, in which:

FIG. 1 is a schematic view of an aircraft turbine engine according to the prior art, seen from the side, FIG. 2 is a partial schematic view in perspective of a turbine engine according to the invention, FIG. 3 is a larger-scale view of the thrust-absorbing means and support means according to the invention of the turbine engine of FIG. 2.

DETAILED DESCRIPTION

Reference is made first of all to FIG. 1, which is a turbine engine 10 according to the prior art, this turbine engine 10 here being a bypass turbojet engine.

The turbine engine 10 comprises, from upstream to downstream in the direction of flow of the gases, a fan 12 that generates a flow that divides into two coaxial flows, the primary flow supplying the engine, which comprises a low-pressure compressor, a high-pressure compressor, a combustion chamber, a high-pressure turbine, a low-pressure turbine and an exhaust nozzle 14 for ejecting the combustion gases.

These engine modules (fan, compressors, combustion chamber, turbines) are surrounded by structural annular casings. The turbine engine 10 thus comprise a plurality of successive annular casings including an intermediate casing 16, a high-pressure compressor casing 18, a combustion chamber casing 20, an inter-turbine casing 22 and an exhaust casing 24.

As shown by FIG. 1, in order to mount and fix the turbine engine 10 on an aircraft strut 26 under its wings, two suspensions 28, 30, respectively upstream and downstream, are provided, so as to form an interface between the turbine engine 10 and the strut 26. The upstream suspension 28 is arranged between the strut 26 and the intermediate casing 16 and the downstream suspension is arranged between the strut 26 and the inter-turbine casing 22.

The suspensions 28, 30 are arranged and contained in two suspension planes P1 and P2 of the turbine engine, which are parallel to each other and orthogonal to the longitudinal axis L-L thereof.

The turbine engine 10 of FIG. 1 further comprises means for absorbing the thrust forces of the engine, which comprise here two longitudinal connecting rods 32, the upstream ends of which are articulated on the intermediate casing 16 and the downstream ends of which are articulated on the downstream suspension 30.

However, this technology has drawbacks, including a complex integration of the equipment in the region extending around the engine through which the thrust-absorbing connecting rods 32 pass.

The invention makes it possible to remedy this drawback by conferring an equipment-supporting function on the thrust-absorbing connecting rods 32.

FIGS. 2 and 3 are an embodiment of the invention in which the thrust-absorbing connecting rods 32 support two items of equipment 34, 36. These items of equipment 34, 36 are here fixed to a support plate 38 that extends between the connecting rods 32 and is fixed thereto.

In the example shown, the connecting rods 32 are not parallel but form an angle between them. The support plate 38 has a substantially trapezoidal shape and occupies an inter-rod space, situated at a distance from the longitudinal ends of the connecting rods. The plate 38 may be metal and has for example a thickness of between 1 and 5 millimeters.

The plate 38 comprises, at its corners, means 40 for fixing to the connecting rods 32, these fixing means comprising here clamping collars that grip the flanges 32 and are locked thereon by means of bolts (not shown).

The items of equipment 34, 36 may be fixed or mounted on the plate 38 by any suitable means, and for example by means of damping studs. In the example shown, the items of equipment 34, 36 are aligned one behind the other along the longitudinal axis LL of the turbine engine, and each comprise a top part 42 extending above the plate 38 (or radially outside the plate with respect to the axis LL) and a bottom part 44 that extends below the plate 38 (or radially inside the plate with respect to the axis LL).

The plate 38 may be metallic and has for example a thickness of a few millimeters.

In the example shown, the connecting rods 32 are mounted downstream of the intermediate casing 16 and their upstream ends are articulated thereon. More precisely, the intermediate casing 16 comprises a hub 50 surrounded by a cylindrical wall (not shown) and connected thereto by radial arms. The upstream ends of the connecting rods 32 are articulated on the hub 50 of the intermediate casing 16.

The downstream ends of the connecting rods 32 are articulated on the ends of a beam 52 that is itself articulated on the downstream suspension 30, as described in the patent application FR 12/51813. The downstream suspension 30 is here connected by connecting rods to a ring 54 mounted around the inter-turbine casing 22.

The invention claimed is:
1. A turbine engine, comprising:
a system for suspending a downstream end of the turbine engine to an aircraft strut, said system absorbing thrust forces and comprising two longitudinal thrust-absorbing connecting rods, upstream ends of the thrust-absorbing connecting rods being connected to an upstream structural annular casing of the turbine engine, and downstream ends of the thrust-absorbing connecting rods being connected to a downstream structural annular casing of the turbine engine,
wherein a support is fixed on the two longitudinal thrust-absorbing connecting rods and extends substantially therebetween, the support carrying or supporting at least one item of equipment which is fixed to or suspended from said thrust-absorbing connecting rods.
2. The turbine engine according to claim 1, wherein the support comprises a support plate substantially coplanar with the thrust-absorbing connecting rods.

3. The turbine engine according to claim 2, wherein the support plate is fixed on the connecting rods by clamping collars or bolted connections.

4. The turbine engine according to claim 2, wherein the support plate carries at least two items of equipment.

5. The turbine engine according to claim 1, wherein the thrust-absorbing connecting rods present an angle therebetween.

6. The turbine engine according to claim 1, wherein the connecting rods have a circular, square or rectangular cross section.

7. The turbine engine according to claim 1, wherein the upstream ends of the thrust-absorbing connecting rods are connected to the upstream structural annular casing of the turbine engine which includes a hub of an intermediate casing, and the downstream ends of the thrust-absorbing connecting rods are connected to the downstream structural annular casing of the turbine engine which includes a downstream suspension connected to a ring mounted around an inter-turbine casing.

8. The turbine engine according to claim 2, wherein the item of equipment passes through the support plate.

9. The turbine engine according to claim 2, wherein sides of the support plate abut the connecting rods.

10. The turbine engine according to claim 2, wherein the support plate is trapezoidal in shape.

11. The turbine engine according to claim 2, wherein the support plate is located at a distance from ends of the thrust-absorbing connecting rods.

\* \* \* \* \*